United States Patent Office 3,389,975
Patented June 25, 1968

3,389,975
PROCESS FOR THE RECOVERY OF ALUMINUM VALUES FROM RETORTED SHALE AND CONVERSION OF SODIUM ALUMINATE TO SODIUM ALUMINUM CARBONATE HYDROXIDE
Robert A. Van Nordstrand, Tulsa, Okla., assignor to Sinclair Research, Inc., New York, N.Y., a corporation of Delaware
No Drawing. Filed Mar. 10, 1967, Ser. No. 622,056
19 Claims. (Cl. 23—315)

ABSTRACT OF THE DISCLOSURE

A process for the recovery of aluminum values, e.g., dawsonite, from oil shales comprising leaching a retorted oil shale with a solution of sodium carbonate and sodium hydroxide to provide a sodium to aluminum atomic ratio of at least about 5:1, most preferably at least about 20:1, to dissolve the aluminum component therein and subsequently precipitating the aluminum component by treating the solution with carbon dioxide. The resulting solution can be recycled to the leaching operation after adjustment of the sodium carbonate and sodium hydroxide contents.

Sodium aluminum carbonate hydroxide can be made from a solution of sodium aluminate and sodium carbonate having a high atomic ratio of sodium to aluminum of at least about 5:1, preferably at least about 20:1, by contacting the solution with carbon dioxide.

---

This invention is directed to the recovery of the aluminum component such as dawsonite, a sodium aluminum carbonate hydroxide, from oil shales containing the same to increase the economic potential of these oil shales and to provide an additional source of aluminum. It is, of course, well known that certain sedimentary rocks, commonly referred to as oil shale, upon heating, yield appreciable quantities of relatively crude mineral oil as well as gaseous hydrocarbons. This oil may be refined into valuable products such as gasoline, diesel oil, jet fuel, and fuel oil. Extensive deposits of oil shale are found in this country, particularly in the so-called Green River shale formation located in the States of Colorado, Utah, and Wyoming. With diminishing world petroleum reserves, there has been considerable interest in developing a commercially feasible process, suitable for application on a large scale, for retorting (i.e., destructive distilling) oil shale to recover its potential yield of crude oil; however, to date the retorting of oil shales has not been extensively practiced on a commercial scale due in large part to the costs of recovering the oil. Recently, however, there have become of interest oil shales which have substantial amounts of aluminum-containing minerals such as dawsonite, i.e., sodium aluminum carbonate hydroxide, which, if recoverable, would increase the economic value of the oil shale and provide a source of aluminum.

Heretofore, alumina from which aluminum is derived has been produced almost exclusively from bauxite, primarily by the Bayer process whose economic feasibility is dependent upon a source of ore having a relatively high aluminum content. There are, however, few commercially workable deposits of bauxite in the United States and these fill at most 20 to 25% of the present U.S. requirements of alumina. Accordingly, there is a large amount of activity in the mining and aluminum industries to develop new sources of alumina. The Bayer process also has several disadvantages aside from requiring an ore of high aluminum content. Depending upon the source of the bauxite, heavy concentrations of caustic soda and high temperatures, e.g. 120 to 140° C. or even 200 to 250° C., can be required in the Bayer process since it relies upon the solubility equilibria of alumina hydrates in caustic soda solution to attack the bauxite and produce alumina. Separation and washing of the insoluble residues remaining from the caustic attack, commonly known as red muds, to obtain a clean aluminate liquor is also difficult due to the very fine size of the particles, sometimes less than 1 micron. Furthermore, it can take 24 hours, or more, to obtain a satisfactory precipitation or settling of aluminum trihydrate from the aluminate liquor before it can be separated for calcination to alumina.

The present invention makes available another source of alumina by providing a process for the recovery or upgrading of the aluminum component, such as dawsonite of certain oil shales whose aluminum content is much too low to be economically recovered by the Bayer process. Oil shales suitable for use in the recovery process of this invention are found in, for example, Rio Blanco County, Colo. The shales contain 5 to 40 wt. percent, particularly about 10 to 30 wt. percent, kerogens, i.e., hydrocarbons which form the recoverable oil, about 5 to 30 wt. percent, particularly about 10 to 20 wt. percent, dawsonite, and about 10 to 40 wt. percent, particularly 20 to 30 wt. percent, quartz, or $SiO_2$ in some form. Nahcolite, which is present in pockets, and dolomite make up the essential remainder of the shale and may comprise about 10 to 40 wt. percent, particularly 20 to 30 wt. percent thereof. The disadvantages of the Bayer process are, to a large part, not present in the instant recovery process since the dawsonite is readily recovered from the oil shales, i.e., reconstituted under fairly mild conditions in a relatively pure crystalline form which can be partially calcined and leached to form alumina or, if desired, calcined to sodium aluminate. Additionally, dawsonite itself has several uses such as in antiacid preparations for mild stomach disorders.

In the instant recovery process, the oil shale is leached with an aqueous solution of sodium carbonate and sodium hydroxide having a concentration sufficient to dissolve the aluminum component at temperatures up to about 110° C., or more, if one cares to use pressure equipment to maintain the liquid phase, and subsequently the aluminum component is precipitated with carbon dioxide and recovered. The oil shale is generally retorted prior to recovery of the aluminum content. In this first or retorting step, the oil shales are generally crushed, e.g., to a particle size of about 1/10 to 100 mm. diameter, preheated and then the oil shale is transferred to a retorting zone where the particles are pyrolyzed to remove the kerogens as a fog or mist and vapors which are subsequently condensed to form an oil. The nahcolite may, if desired, be leached out prior to retorting, e.g. after crushing.

In one of the retorting methods presently receiving commercial consideration for the recovery of oil, the shale is retorted in such a manner as to maintain a stationary zone of combustion near the top of an oil shale layer and at the same time fresh shale is moved upwardly into this zone of combustion and the products of combustion are drawn downward, countercurrently to the upward moving fresh shale, so as to preheat the latter and at the same time to drive off the mineral oils and also to effect cooling and/or condensation of vaporized oil. In another retorting method, the shale is passed downwardly countercurrently to hot gases so as to separate the oil from the oil-bearing solid material. The details of the retorting processes are well known to those skilled in the art.

Retorting not only is desirable in this invention to recover the kerogens, but also to convert the shale to a form from which the aluminum is readily recoverable.

Without retorting, the aluminum is difficult to recover from the oil shale since the kerogen makes the aluminum more or less inaccessible, whereas, upon retorting, the shale becomes porous and friable. Upon heating at a temperature of at least about 500° F., for example, crystalline dawsonite decomposes going to an amorphous state and, depending upon the temperature and other conditions, may be converted to other crystalline materials. For instance, if heated at about 900° F., cooled and then exposed to air, sodium carbonate and bayerite crystallize out of the amorphous dawsonite. At temperatures of about 1300° F. the dawsonite is converted to crystalline sodium aluminate. The aluminum is, however, readily recoverable by alkali leaching of these various forms. Additionally, retorting decomposes the dolomite in the shale to produce $CO_2$, calcite and MgO. The MgO ties up part of the $SiO_2$ in the shale to permit higher recovery of the aluminum values by leaching. Otherwise, this $SiO_2$ can, during retorting or leaching, react with the aluminum to form sodium aluminum silicate from which aluminum recovery is very difficult and uneconomical.

Retorting temperatures for the oil shale are generally from about 500 to 1500° F., or higher, e.g., up to about 1700° F. preferably about 800° to 1000° F. or even 1200° F. The upper temperature is usually that at which coking or undue cracking of the recovered oil vapors is a significant problem. Essentially all of the oil is recovered at temperatures in the range of from about 500 to 1200° F. With some oil shales, additional heating after retorting may improve aluminum recovery and in all cases retorting is carried out for a sufficient time to convert the dawsonite to a recoverable form. If additional heating is desirable, it may be conducted at temperatures of from about 1000 to 2400° F. for a time after removal of the kerogens sufficient to improve aluminum recovery, e.g., up to several hours, preferably about ten minutes to 2, 4 or even more hours. Whether or not recovery is increased by additional heating may depend upon the particular composition of the shale and each shale may be tested to determine this point. If desired, the retorted shale can be crushed after retorting, e.g., to a particle size of about 10 mm., or less, diameter.

The shale, after retorting, and additional heating if desired, is leached with a solution containing sodium carbonate and sodium hydroxide, under relatively mild conditions to dissolve the aluminum component and obtain a solution containing sodium aluminate, sodium carbonate and any excess sodium hydroxide. The leaching conditions include a basic pH sufficient to dissolve the aluminum component of the shale, preferably above about pH 11, and a temperature and time sufficient to dissolve the aluminum component but low enough to avoid dissolving much $SiO_2$, if present. The shale is advantageously leached while it is still warm from the retorting step. In general, leaching temperatures up to about 105 or 110° C., preferably about 40 to 100° C., particularly about 50 to 70° C., are suitable. The temperature should remain low enough to avoid substantial reaction with $SiO_2$, since with higher leaching temperatures more $SiO_2$ is dissolved by the alkali and the $SiO_2$ will re-precipitate as sodium aluminum silicate from which recovery of the aluminum is quite difficult. The lower temperatures are preferred since the equipment requirements, dangers to personnel, etc., are less.

Short leaching times are desirable to reduce the overall time of the process. Leaching times from about 5 to 10 minutes up to several hours, e.g., about 2 or more hours, preferably about 5 minutes to 1 hour, can be used, if desired, depending upon the temperature, volume and pH of the leach solution, and periods of about 15 to 30 minutes have been found to be particularly suitable.

The leach solution is used in a sufficient amount, e.g., above about twice the weight of the solids being treated, to give a fluid slurry so that the solution will thoroughly leach the retorted shale, and, in general, excess amounts of the leach solution are used so that the aluminum component will to a large degree be extraced with the leach solution thereby reducing the amount of washing necessary to obtain good aluminum recovery. Also, continuous countercurrent leaching of the shale can then be accomplished. However, since the leach extract contains fairly dilute amounts of aluminum further dilution with wash water is not too significant. The leach solution is typically a recycle solution and it is also desired in the treating slurry to have a high liquid to solids ratio. From about 5 to 25 or more parts by weight of leach solution per part of solids treated has been found to be a suitable amount in the slurry.

The leach solution generally contains a concentration of sodium hydroxide sufficient to extract the desired amount of aluminum, that is to solubilize the aluminum component in the retorted oil shale, which is at least a concentration sufficient to provide a sodium to aluminum atomic ratio of about 1:1, and this ratio usually does not exceed about 6:1 as larger amounts do not seem to improve aluminum recovery sufficiently to justify the added cost. The actual concentration of sodium hydroxide will, therefore, depend upon several factors including the aluminum content of the shale, amount of recycle solution, temperature of leaching, etc. For instance, at 5 wt. percent available $Al_2O_3$ (11% dawsonite in the original shale) and at about a 12:1 weight ratio of solution to solids treated, a solution having about an 0.4 wt. percent concentration of sodium hydroxide gave a good recovery of the aluminum component in the shale. There will preferably be from about one to about three sodium ions per aluminum ion provided in the slurry from free sodium hydroxide, based on the aluminum recovered. Some of this sodium requirement can also come from the sodium aluminate in the retorted oil shale. The requirement that the sodium hydroxide must be subsequently neutralized in order to recover the aluminum component places, however, a practical upper limit on the concentration of sodium hydroxide. Generally, the concentration of sodium hydroxide in the solution will be from about 0.2 to 4 wt. percent, preferably about 0.3 to 1 wt. percent, based on the water and sodium hydroxide.

Sodium carbonate is present in the leach solution in amounts effective to provide sodium ions from the sodium carbonate and sodium hydroxide sufficient to precipitate the aluminum component in essentially crystalline form rather than as a gelatinous form. Crystals are desired for ease of recovery, e.g., by filtration. At the time of precipitation it is desired to have in the slurry a sodium to aluminum atomic ratio of at least about 5:1, preferably at least about 10:1, most advantageously at least about 20:1 and often not above about 60:1. The sodium carbonate is present in the leach solution in an amount of at least about 1.5 moles per mole of sodium hydroxide. Preferably this ratio is at least about 4:1 or even at least about 8:1. The sodium is employed both as the hydroxide and as the carbonate, however, for reasons discussed above, it is desired to keep the amount of sodium supplied as free sodium hydroxide at a minimum because of its expense and also to reduce the carbon dioxide requirements. In addition to sodium hydroxide and sodium carbonate some sodium may be supplied as sodium chloride, coming either from leaching of the oil shale or from brine used in making up the leach solution. Insofar as an upper amount of sodium is concerned, the leach solution can be saturated with sodium carbonate although both the most efficient amounts of sodium carbonate and sodium hydroxide required can be easily determined and are dependent upon such variables as temperature of leaching, amount of recycle solution and aluminum and sodium contents of the shale.

Following leaching, the leach solution which now contains dissolved aluminum, e.g. sodium aluminate, is filtered to separate undissolved solids, e.g., dolomite, quartz, calcite, etc., and then treated to neutralize the hydroxide, e.g., with carbon dioxide, and precipitate the aluminum component. Carbon dioxide is generally used in an amount sufficient to precipitate the dissolved aluminum component as sodium aluminum carbonate hydroxide. The use of excess carbon dioxide has no adverse effect on the precipitation but is of little, if any, value since it merely bubbles out and a portion may have to be removed from the leach solution before it can be recycled. The leach solution may be heated during the carbon dioxide treatment, preferably to between about 60° and 100° C., since this tends to improve the crystallinity of the precipitate. The aluminum component precipitate can be separated from the alkaline mother liquor, e.g., by filtration, and washed. The carbonated mother liquor remaining after separation of the aluminum precipitate can be adjusted to proper concentration of sodium carbonate by adding or removing water or sodium carbonate, and then adjusted to the proper concentration of sodium hydroxide by treating with lime (Ca(OH)$_2$) including unslaked lime (CaO) to precipitate out some of the carbonate ions as CaCO$_3$, or by adding sodium hydroxide. The treated solution can then be recycled to the leaching step for treatment of additional retorted oil shale.

The following examples serve to illustrate the invention.

EXAMPLE I

An oil shale from the center of the Piceance Basin, Rio Blanco County, Colo., taken over the depth interval 1969′ to 2438′ was crushed to a ⅛ to ¼ inch size. In addition to about 21 gallons of oil per ton, this shale contains about 11% dawsonite [NaAlCO$_3$(OH)$_2$] with the remainder being primarily quartz (SiO$_2$) and dolomite

[CaMg(CO$_3$)$_2$]

A sample of the shale was placed in an oil shale assay retort operated so the pyrolysis of the shale is carried out in the effective absence of oxygen for 2 hours at 1200° F. to drive off the oil, water and CO$_2$. The retorted oil shale was a black, porous, friable substance. This retorted oil shale was crushed to an approximate size to pass a 100 mesh sieve.

A portion of the crushed retorted shale was then treated by a leaching operation. In the leaching operation, 50 g. retorted oil shale were added to the leach solution in a stainless steel beaker at 60° C. and stirred for 15 minutes. The suspension was then freed of solids by pumping it through a vacuum filter funnel (Buchner type). The retained oil shale, free of leach solution, was then washed with 50 cc. water. The leach solution and the wash water were combined and heated to 95° C. in a stainless steel beaker. While stirring and holding at 95° C., the beaker (loosely covered) was flooded with gaseous CO$_2$. The CO$_2$ was absorbed, gradually converting the solution from the alkaline side to the bicarbonate side. At the time this conversion occurs a cloudy precipitate of dawsonite forms. The heating, stirring and flooding with CO$_2$ continued for 45 minutes after this conversion.

The suspension of dawsonite in the sodium carbonate-bicarbonate solution was then cooled somewhat and transferred to a Buchner funnel. The dawsonite was freed of mother liquor, washed a few times with water, dried and weighed. As the hot mother liquor cools additional dawsonite precipitates. This additional precipitate was also recovered, except in Run No. 1. Some loss of yield is caused by retention of dawsonite on the filter paper. The leaching solution and results are set forth in the following table.

TABLE I

| Run No. | 1 | 2 | 3 | 4 | 5 |
|---|---|---|---|---|---|
| Retorted Oil Shale (g.) | 50 | 50 | 50 | 50 | 50 |
| Leaching Solutions: | | | | | |
| Water (ml.) | 500 | 500 | 500 | | 500 |
| Na$_2$CO$_3$ (g.) | 106 | 106 | 106 | 106 | 84.5 |
| NaCl (g.) | 0 | 0 | 0 | 0 | 25 |
| NaOH (g.) | 2 | 4 | 10 | 4 | 4 |
| Na/Al atomic ratio | 41 | 42 | 45 | | |
| Yield of dawsonite (g.) | 3.35 | 5.25 | 5.89 | 4.3 | [1] 5.04 |
| Percent of original dawsonite [2] | 47 | 74 | 83 | 61 | 71 |

[1] Only a trace (−1 p.p.m.) of chloride was found in this product.
[2] Assuming the original dawsonite in the oil shale corresponds to 7.0 g. per 50 g. of retorted oil shale.

The solution used in Run 1 to treat the retorted oil shale, which would be expected to give 2.47 g. Al$_2$O$_3$ based upon prior assay, included 2.0 g. NaOH, enough to react with and to solubilize (as NaAlO$_2$) 2.55 g. Al$_2$O$_3$. The 106 g. Na$_2$CO$_3$ provides a ratio of total Na ions to Al ions of 41:1, if the above-cited 2.55 g. Al$_2$O$_3$ is solubilized. This high Na:Al ratio and the corresponding high CO$_3$ to Al ratio produces well-crystallized dawsonite in preference to aluminum hydroxide gel. The NaOH content was increased for Runs 2 and 3, the latter having sufficient NaOH to give an approximately 5:1 Na to Al atomic ratio.

In Run 4, the mother liquors from which dawsonite was precipitated in Runs 2 and 3 were combined and reused, after adjusting the sodium carbonate concentration to match the density of the standard leaching solution, i.e., 106 g. Na$_2$CO$_3$ in 500 cc. water. Then 4 g. NaOH was added. This run demonstrates that the leach solution can be recycled after removing its aluminum content as dawsonite and treatment to give the desired NaOH and Na$_2$CO$_3$ contents.

Run 5 utilizes 5% brine in place of water to formulate the leaching solution since fresh water is scarce in many areas where oil shale is found. In Run 5 the sodium carbonate in the solution was reduced to 84.5 g. This adjustment maintained the sodium ion concentration at the same level, but dropped the carbonate ion concentration. 4 g. NaOH was used.

If one desires to prepare sodium aluminum carbonate hydroxide from a source other than oil shale, an aqueous sodium aluminate and sodium carbonate solution corresponding to the leach extract can be prepared by other procedures. For instance, sodium aluminate and sodium carbonate can be mixed in amounts so that the sodium to aluminum atomic ratios correspond to those present in the extract solution with the sodium aluminate being obtained by the addition of sodium hydroxide to a suitable aluminum compound. The sodium aluminate generally has a sodium to aluminum atomic ratio of at least about 1:1, generally not exceeding 6:1 and preferably 1 to 3:1. The following examples illustrate the production of sodium aluminum carbonate hydroxide from sodium aluminate and sodium carbonate.

EXAMPLE II

Sodium aluminate and sodium carbonate were stirred in aqueous solution and heated to 95° C. At this time, the surface of the solution in the vessel was flooded with CO$_2$ at 1 atm. until precipitation occurred, over 45 minutes. The make-up of the solution including amounts of sodium aluminate and sodium carbonate for several runs made are set forth in Table II.

TABLE II

| Run | Na$_2$CO$_3$ (g.) | NaAlO$_2$ (g.) | H$_2$O (cc.) | Ratio Na/Al | Dawsonite (X-Ray Diffraction) |
|---|---|---|---|---|---|
| A | 106 | 4.10 | 500 | 41.0 | Very well crystallized. |
| B | 53 | 4.10 | 500 | 21.0 | Well crystallized. |
| C | 26 | 4.10 | 500 | 11.0 | Moderately crystallized. |
| D | 0 | 4.10 | 500 | 1.0 | Boehmite and Bayerite. |
| E | 106 | 136 | 500 | 2.6 | Boehmite and small amount of dawsonite poorly crystallized. |

The results set forth in Table II illustrate the effect of the sodium to aluminum atomic ratio in the solution upon the precipitated product. As demonstrated by run C, a Na/Al ratio of 11 produces a moderately well defined crystalline dawsonite whereas with the lower Na/Al ratios of runs D and E, boehmite and bayerite are produced. The preference for the higher Na/Al ratios is clearly demonstrated by runs A and B.

It is claimed:

1. A process for the separation of aluminum from retorted oil shale originally containing sodium aluminum carbonate hydroxide, comprising leaching the shale with at least about twice its weight of an aqueous leach solution containing sodium carbonate and sodium hydroxide, the sodium hydroxide being present in an amount sufficient to solubilize the aluminum component in the retorted oil shale, the sodium carbonate being present in an amount of at least about 1.5 moles per mole of sodium hydroxide, said sodium carbonate and sodium hydroxide being present in the leach solution in an amount sufficient to provide a sodium to aluminum atomic ratio in excess of at least about 5 to 1, based upon the aluminum recovered, after separation of the solution, separating the solution containing the dissolved aluminum component, passing carbon dioxide into said solution in an amount sufficient to precipitate sodium aluminum carbonate hydroxide, and separating precipitated sodium aluminum carbonate hydroxide from the aqueous phase.

2. The process of claim 1 wherein the leaching temperature is up to about 110° C.

3. The process of claim 2 wherein the sodium to aluminum atomic ratio is at least about 10:1 and the atomic ratio of sodium carbonate to sodium hydroxide is at least about 4:1.

4. The process of claim 3 wherein the leach solution contains about 0.2 to 4 weight percent sodium hydroxide.

5. The process of claim 4 wherein the pH of the leach solution is above about 11.

6. The process of claim 5 wherein the sodium from sodium hydroxide to aluminum atomic ratio is about 1 to 3:1 in the leach solution and the weight of leach solution is about 5 to 25 times the weight of the retorted oil shale.

7. The process of claim 1 wherein the leaching temperature is about 40 to 100° C.

8. The process of claim 7 wherein the temperature of the carbon dioxide treatment is about 60 to 100° C.

9. The process of claim 8 wherein the leaching time is between about 5 minutes and 2 hours.

10. The process of claim 1 further comprising treating the alkaline mother liquor remaining after recovery of the precipitated sodium aluminum carbonate hydroxide to provide a sodium to aluminum ratio of at least about 5 to 1 based upon the aluminum recovered, and a sodium hydroxide content sufficient to solubilize the aluminum component of the oil shale in a subsequent leaching operation and recycling the treated alkaline mother liquor to provide said aqueous leaching operation.

11. A process for the separation of aluminum from retorted oil shale originally containing sodium aluminum carbonate hydroxide comprising leaching the shale with at least about twice its weight of an aqueous leach solution having a pH sufficient to solubilize the aluminum component in the shale and containing sodium hydroxide and sodium carbonate, the sodium carbonate being present in an amount of at least about 1.5 moles per mole of sodium hydroxide, said sodium carbonate and sodium hydroxide being present in the leach solution in an amount sufficient to provide a sodium to aluminum atomic ratio in excess of at least about 5 to 1 based upon the aluminum recovered, passing carbon dioxide into said solution in an amount sufficient to precipitate sodium aluminum carbonate hydroxide, separating precipitated sodium aluminum carbonate hydroxide from the aqueous phase, treating the resulting mother liquor to prepare said leach solution and recycling said prepared leach solution to provide said aqueous leach solution.

12. The process of claim 11 wherein the pH is above about 11.

13. The process of claim 12 wherein the treatment of the mother liquor comprises adjusting the sodium carbonate concentration by adding or removing water or sodium carbonate followed by the addition thereto of sufficient lime to prepare said leach solution and the separation of the resulting calcium carbonate.

14. A process for the synthesis of sodium aluminum carbonate hydroxide comprising heating an aqueous solution of sodium aluminate and sodium carbonate having a sodium to aluminum atomic ratio of at least about 5 to 1 and containing at least about 4 moles of sodium carbonate per mole of sodium as sodium aluminate, said sodium aluminate having a sodium to aluminum ratio of at least 1 to 1, reacting the solution with carbon dioxide to precipitate sodium aluminum carbonate hydroxide and separating the sodium aluminum carbonate hydroxide from the aqueous phase.

15. The process of claim 14 wherein the sodium to aluminum atomic ratio is at least about 10 to 1.

16. The process of claim 14, wherein the solution is heated to a temperature of about 60 to 100° C.

17. The process of claim 16 wherein the sodium to aluminum atomic ratio is at least about 20 to 1.

18. The process of claim 14 wherein there are at least about 8 moles of sodium carbonate per mole of sodium as sodium aluminate.

19. The process of claim 12 wherein the treatment of the mother liquor comprises adjusting the sodium carbonate concentration therein and adding sufficient sodium hydroxide to prepare said leach solution.

References Cited
UNITED STATES PATENTS

| | | | |
|---|---|---|---|
| 2,783,124 | 2/1957 | Grote | 23—315 |
| 2,921,838 | 1/1960 | Melvill | 23—52 |

EARL C. THOMAS, *Primary Examiner.*

H. S. MILLER, *Assistant Examiner.*